Jan. 18, 1949.  W. SACKVILLE  2,459,185
RADIANT ENERGY DETECTOR
Filed June 23, 1938
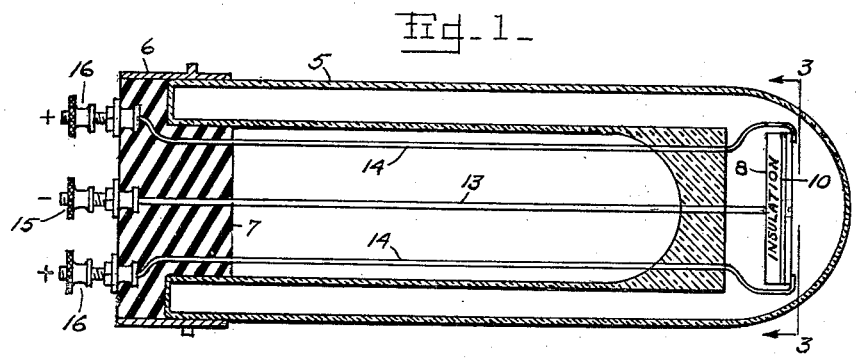
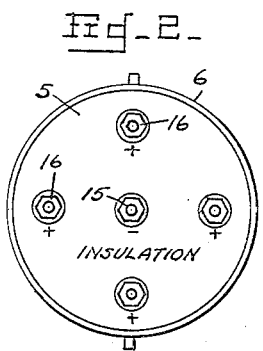
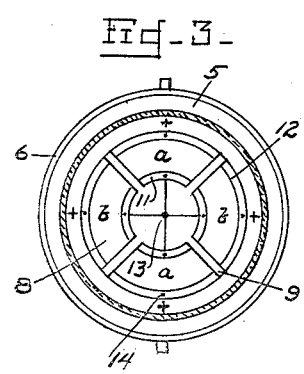
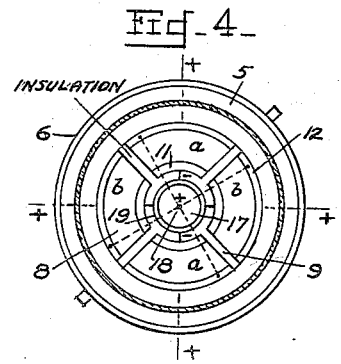
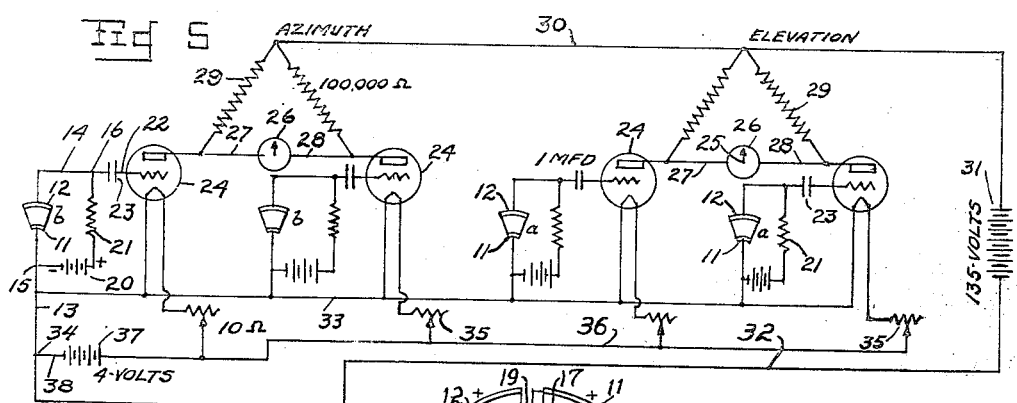
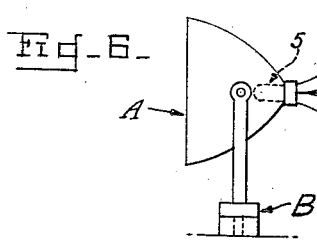
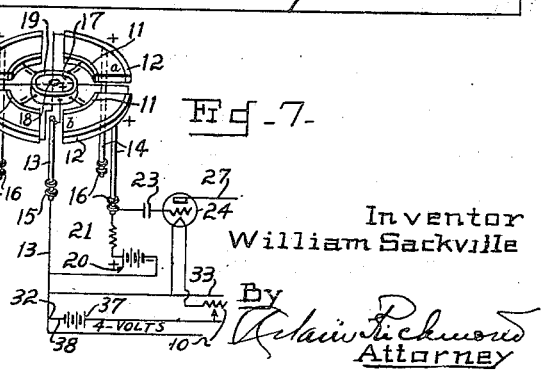
Inventor
William Sackville
By
Attorney Patented Jan. 18, 1949

2,459,185

UNITED STATES PATENT OFFICE 2,459,185

RADIANT ENERGY DETECTOR

William Sackville, Berkeley, Calif., assignor to the United States of America as represented by the Secretary of War Application June 23, 1938, Serial No. 215,509

6 Claims. (Cl. 250—83.3)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to radiant energy detectors.

Instruments for detecting radiant energy are divided into five groups.

Group I consists of non-selective radiometers such as the thermopile, which functions upon thermal conditions independently of the (frequency) wave length of stimulus.

Group II includes resistance cells such as the thalofide cell, which have the property of decreasing in electrical resistance when exposed to radiant energy of short wave lengths, the character of the phenomenon depending entirely upon the wave length of the radiant energy stimulus.

Group III includes substances called photoelectric cells which when charged to a negative potential in any evacuated chamber, lose their charge when exposed to light of short wave length.

Group IV consists of substances which when exposed to radiant energy become fluorescent or phosphorescent.

Group V consists of substances which undergo a chemical change when exposed to radiant energy, such as the deposit of silver on a photographic plate.

An object of this invention is to provide a detector in which a multiple cell tube containing any material sensitive to radiant energy may be used.

Another object of this invention is to balance out an equal energy background of sky effect within adjacent portions of a field of view.

The invention also contemplates novel means for indicating the reception of radiant energy on the sensitive cells.

One practical embodiment of the invention is shown by way of illustration in the accompanying drawings, wherein:

Fig. 1 is a longitudinal section of a multicell tube;

Figs. 2 and 3 are respectively rear and front elevations thereof;

Fig. 4 is a front elevation of a modified form;

Fig. 5 is a diagrammatic view of the complete detector;

Fig. 6 is a diagrammatic illustration of the detector tube and its mounting showing the positive and negative leads extending from the detector tube;

Fig. 7 is a diagrammatic view illustrating the oppositely disposed quadrants a—a, b—b, their inner and outer electrodes, the marginal and central electrodes of the modification shown in Fig. 4, the electrical connections between said marginal and central electrodes and the inner and outer electrodes of the quadrants, and also the electrical connections between said marginal and central electrodes and the grid and filament circuits of one of the triodes of the amplifier system shown in Fig. 5 of the drawings.

Referring to the drawings by characters of reference:

There is provided an evacuated container 5, which is of the conventional tube type, having a base casing 6 encircling insulating material 7.

Within the tube, and preferably situated toward its forward end is a disk 8 of insulating material, formed on its exposed face with radially disposed ribs 9 dividing an outer circular portion of the face of the disk into oppositely disposed quadrants a—a and b—b respectively.

Material 10 sensitive to radiant energy is disposed in each quadrant and confined therein between inner and outer electrodes 11 and 12 respectively. The inner electrodes 11 are connected to a lead wire 13 while the outer electrodes have individual lead wires 14. The leads pass through and are sealed in the insulation 7 of the base and terminate in binding posts 15 and 16.

Referring to the modified form shown in Fig. 4, a body of material 17 sensitive to radiant energy, conveniently of circular formation, is placed on the central portion of the disk 8 within the electrodes 11 and provided with a central electrode 13 and a marginal electrode 19. In this arrangement the central electrode 18 is electrically connected with the outer electrodes 12, while the marginal electrode 19 is electrically connected with the inner electrodes 11, as clearly shown in Fig. 7 of the drawings, otherwise the electrical connections for the modification under discussion are the same as hereinafter to be described in connection with the preferred form of the instant invention. By constructing and electrically connecting the central and marginal electrodes of the tube in this manner, a more positive indication of the centering of the tube on the object is afforded.

While the response of the cells to radiant energy may be indicated by any well known device for indicating the flow of electric energy, the system shown diagrammatically in Fig. 5 is preferred.

In Fig. 5 the quadrants a—a and b—b of the tube or container 5 are shown with their electrodes 11 and 12, lead wires 13 and 14 and binding posts 15 and 16. A source of electric current supply 20 has its minus terminal connected to the binding post 15 and its plus terminal connected through resistances 21 to the binding posts 16. The binding posts 16 are connected through lead wires 22, in each of which is interposed a condenser 23 to the grids of the triodes 24. Condensers 23 are so chosen that the capacity thereof will prevent a permanent change of bias on the grids, but, at the same time, allow a varying circuit voltage to pass to the grids. Such a condition will prevent the needles 25 of the two-way reading galvanometers 26—26 drifting from their zero positions due to temperature and other minor changes in circuit, while at the same time, they will cause movement of the needles due to reception of an unequal amount of energy stimulus upon the faces of the paired segments. Thus the galvanometer will be activated only when a varying voltage is applied to one of the two paired grids of the amplifier tubes.

Galvanometers 26—26 are connected across the plates of respective pairs of tubes through lead wires 27—27 and 28—28. Resistances 29, herein shown as of 100,000 ohms, one connected to the respective wires 27 and 28 and to a lead wire 30 from the plus terminal of a battery 31, the other terminal in which battery is connected through wire 32 to the binding post 15.

The minus terminals of the filaments of the triodes 24 through the lead wire 33 are connected to the lead 32 at 34, while the plus terminals of said filaments are connected through variable resistances 35 to lead wire 36 connected to the plus terminal of a source of electric current supply 37, the other terminal of which is connected through lead 38 to the lead wire 32.

It is proposed to mount the multicell detector at the focus of a parabolic mirror A, adjustable in azimuth and elevation by means of a conventional mounting B, as shown in Fig. 6 of the drawings. In this position, the paired segments $a$—$a$ and $b$—$b$ are exposed to adjacent portions of the field of view. When this field is composed of an equal energy background, no contrast exists as between the adjacent portions of the field of view, and the sensitive material of each segments will receive an equal amount of energy stimulus. The background may be represented by the natural sky or by an artificial sky (radiant background) produced by placing energy therein. In either case, an equal energy background will produce no directional effect in the multicell. However, when an object appears in one portion of the field of view of the receiver mirror, segments of the multicell will receive an unequal amount of energy stimulus; thus producing a manifestation of directional effect in the galvanometer.

I claim:

1. The combination with a radiant energy detector including a container, an insulated support in the container, a plurality of oppositely paired spaced segments of material sensitive to radiant energy annularly arranged on the support, electrodes on the inner and outer marginal portions of the segments, and lead wires for the electrodes; of a pair of triodes for each pair of oppositely spaced segments, electrical connections between the outer electrodes of the segments and grids on the triodes, means interposed in said connections to prevent a permanent change in grid bias while permitting a varying circuit voltage to pass to the grid, connections between the inner electrodes of the segments and the filaments of the triodes, a source of direct current electrical supply connected to the grid and filament connections, an indicator connected across the plates of each pair of tubes, means for supplying current to the filaments and means for supplying current to the plates.

2. The combination with a radiant energy detector including a container, and a plurality of oppositely paired spaced segments of material sensitive to radiant energy annularly arranged in the container; of a pair of triodes for each pair of oppositely spaced segments, electrical connections between the outer marginal portion of the segments and the grids of the triodes, means interposed in said connections to prevent a permanent change in grid bias while permitting a varying circuit voltage to pass to the grid, connections between the inner marginal portions of the segments and the filaments of the triodes, a source of direct current electrical supply connected to the grid and filament connections, an indicator connected across the plates of each pair of triodes, means for supplying current to the filament and means including a resistance for each plate for supplying current to the plates.

3. The combination with a radiant energy detector including a container, and a plurality of oppositely paired spaced segments of material sensitive to radiant energy annularly arranged in the container; of a pair of amplifying tubes for each pair of oppositely spaced segments, electrical connections between the outer marginal portions of the segments and the grids of the amplifiers, connections between the inner marginal portions of segments and the filaments of the amplifiers, a source of direct current electrical supply connected to the grid and filament connections, an indicator connected across the plates of each pair of amplifiers, means for supplying current to the filaments of the amplifiers and means including a resistance for each plate for supplying current to the plates.

4. The combination with a radiant energy detector including a container, an insulated support within the container, a plurality of oppositely paired spaced segments of material sensitive to radiant energy annularly arranged on the support, electrodes on the inner and outer marginal portions of the segments, a body of material sensitive to radiant energy carried by the support within the segments, a central and a marginal electrode on said body; of a pair of triodes for each pair of oppositely spaced segments, electrical connections between the outer electrodes of the segments, the central electrode of said body and the grids of the triodes, connections between the inner electrodes of the segments, the marginal electrode of said body and the filaments of the triodes, a source of direct current electrical supply connected to the grid and filament connections, an indicator connected across the plates of each pair of triodes, means for supplying current to the filaments and means for supplying current to the plates.

5. The combination with a radiant energy detector including a container, an insulated support within the container, a plurality of oppositely paired spaced segments of material sensitive to radiant energy annularly arranged on the support, electrodes on the inner and outer marginal portions of the segments, a body of material sensitive to radiant energy carried by the support within the segments, a central and a marginal electrode on said body; of a pair of triodes for each pair of oppositely spaced segments, electrical connections between the outer electrodes of the segments, the central electrode of said body and the grids of the triodes, means interposed in said connections to prevent a permanent change in grid bias while permitting a varying circuit voltage to pass to the grid, connections between the inner electrodes of the segments, the marginal electrode of said body and the filaments of the triodes, a source of direct current electrical supply connected to the grid and filament connections, an indicator connected across the plates of each pair of triodes, means for supplying current to the filaments and means for supplying current to the plates.

6. The combination with means for collecting and focusing radiant energy from a distant body, and detector means disposed within the focal region of the collected energy, said means including a container and a plurality of oppositely paired spaced segments of material sensitive to radiant energy annularly arranged within the container; of means in electrical relation with the segments for balancing out the effect of background radiation when said segments receive an equal amount of energy stimulus and for indicating changes in background radiation when said segments receive an unequal amount of energy stimulus, said means including a pair of amplifying tubes for each pair of oppositely spaced segments, electrical connections between the outer marginal portion of the segments and the grids of the amplifiers, connections between the inner marginal portions of the segments and the filaments of the amplifiers, a source of direct current electrical supply for the grid and filament connections, an indicator connected across the plates of each pair of amplifiers, means for supplying current to the filament and means including a resistance for each plate for supplying current to the plates.

WILLIAM SACKVILLE.

REFERENCES CITED

The following references are of record in the file of this patent:

UNITED STATES PATENTS

| Number | Name | Date |
|---|---|---|
| 1,343,393 | Hoffman | June 15, 1920 |
| 1,401,644 | Rice | Dec. 27, 1921 |
| 1,872,975 | Kolster | Aug. 23, 1932 |
| 2,075,094 | Chubb | Mar. 30, 1937 |